United States Patent
Fransen

(10) Patent No.: US 9,986,432 B2
(45) Date of Patent: May 29, 2018

(54) METHOD AND SYSTEM FOR PROVIDING SECURITY FROM A RADIO ACCESS NETWORK

(71) Applicants: Koninklijke KPN N.V., The Hague (NL); Nederlandse Organisatie voor Toegepast-Natuurwetenschappelijk Onderzoek TNO, s-Gravenhage (NL)

(72) Inventor: Frank Fransen, Zuidhorn (NL)

(73) Assignees: Koninklijke KPN N.V., The Hague (NL); Nederlandse Organisatie voor Toegepast-Natuurwetenschappelijk Onderzgek TNO, 's-Gravenhage (NL)

( * ) Notice: Subject to any disclaimer, the term of this patent is extended or adjusted under 35 U.S.C. 154(b) by 194 days.

(21) Appl. No.: 15/105,439
(22) PCT Filed: Dec. 23, 2014
(86) PCT No.: PCT/EP2014/079166
§ 371 (c)(1),
(2) Date: Jun. 16, 2016
(87) PCT Pub. No.: WO2015/097223
PCT Pub. Date: Jul. 2, 2015

(65) Prior Publication Data
US 2016/0323737 A1    Nov. 3, 2016

(30) Foreign Application Priority Data
Dec. 23, 2013    (EP) ..................................... 13199353

(51) Int. Cl.
*H04W 12/04*    (2009.01)
*H04W 12/06*    (2009.01)
(Continued)

(52) U.S. Cl.
CPC ...... *H04W 12/04* (2013.01); *G06F 17/30312* (2013.01); *H04L 63/0428* (2013.01); *H04L 63/083* (2013.01); *H04W 12/06* (2013.01); *H04L 63/0884* (2013.01); *H04W 88/08* (2013.01)

(58) Field of Classification Search
CPC ...... H04W 12/00; H04W 12/04; H04W 12/06
See application file for complete search history.

(56) References Cited

U.S. PATENT DOCUMENTS

2003/0088769 A1* 5/2003 Quick, Jr. ............... H04L 63/06
713/169

FOREIGN PATENT DOCUMENTS

CN    102625306 A    8/2012
EP    2034661 A1    3/2009
(Continued)

OTHER PUBLICATIONS

European Search Report, European Patent Application No. 13199353.7, dated Apr. 2, 2014, 9 pages.
(Continued)

*Primary Examiner* — Kamran Afshar
*Assistant Examiner* — Farideh Madani
(74) *Attorney, Agent, or Firm* — McDonnell Boehnen Hulbert & Berghoff LLP

(57) ABSTRACT

The disclosure relates to a security method and system in a telecommunications network comprising a radio access network system and a core network system. The radio access network system is configured to provide a wireless radio interface for at least one user device, wherein a shared secret key is stored in both the user device and the core network system. At least one vector is received from the core network system comprising one or more values derived from the shared secret key. At least one of an authentication procedure and a key agreement procedure is performed in the radio access network system for the user device over the wireless radio interface using the one or more values of the received vector for establishing a connection between the user device and the radio access network system.

17 Claims, 9 Drawing Sheets

(51) Int. Cl.
  *G06F 17/30* (2006.01)
  *H04W 88/08* (2009.01)
  *H04L 29/06* (2006.01)

(56) References Cited

FOREIGN PATENT DOCUMENTS

| EP | 2503754 A1 | 9/2012 | |
|---|---|---|---|
| FI | EP 2503754 A1 * | 9/2012 | ............. H04L 63/08 |
| WO | 2008/080637 A1 | 7/2008 | |
| WO | 2011/134039 A1 | 11/2011 | |

OTHER PUBLICATIONS

Asaeda, Hitoshi et al., "Structuring Proactive Secret Sharing in a Mobile Ad-Hoc Networks", 2006 1st International Symposium on Wireless Pervasive Computing, IEEE, Jan. 16-18, 2006, 6 pages.

PCT International Search Report and Written Opinion, PCT International Application No. PCT/EP2014/079166, dated Mar. 16, 2015, 12 pages.

"3rd Generation Partnership Project: Technical Specification Group Services and System Aspects; 3GPP System Architecture Evolution (SAE); Security Architecture (Release 10)", 3GPP TS 33.401, V10.0.0, Mar. 2011, pp. 1-113.

"3rd Generation Partnership Project; Technical Specification Group Services and System Aspects; 3G Security; Security Architecture (Release 10)", 3GPP TS 33.102, V10.0.0, Dec. 2010, pp. 1-72.

"3rd Generation Partnership Project; Technical Specification Group Services and System Aspects; Study on Isolated Evolved Universal Terrestrial Radio Access Network (E-UTRAN) Operation for Public Safety (Release 13)", 3GPP TR 22.897, V2.0.0, Jun. 2014, pp. 1-24.

"3rd Generation Partnership Project; Technical Specification Group Services and System Aspects; Network Architecture (Release 9)", 3GPP TS 23.002, V9.5.0, Dec. 2010, pp. 1-94.

* cited by examiner

METHOD AND SYSTEM FOR PROVIDING SECURITY FROM A RADIO ACCESS NETWORK

CROSS REFERENCE TO RELATED APPLICATIONS

The present application is a national stage entry of, and claims priority to, PCT/EP2014/079166, filed on Dec. 23, 2014, which claims priority to European Patent Application EP 13199353.7, filed in the European Patent Office on Dec. 23, 2013, both of which are hereby incorporated in their entirety herein by reference.

FIELD OF THE INVENTION

The invention relates to a method and system for providing security from a radio access network. More specifically, the invention relates to a method and system for providing security from a radio access network in case security functions are not available or are not obtained from the core net-work system.

BACKGROUND

During the last decade, mobile telecommunications has become the predominant form of communications and further growth is expected in the years to come. Mobile telecommunications relies on the existence of a radio access network system providing radio coverage by means of base stations (e.g.(e)NodeBs) in areas through which mobile user devices can move. The base stations are connected to a core network system of the telecom provider in order to allow communication services to be established. The core network system comprises several further telecommunications nodes.

One such node is the Home Subscriber System (HSS). The HSS has two functions, viz. (1) storing user subscription information and updating this information when necessary and (2) generating security information from one or more secret keys. The secret keys are normally shared between the HSS and the (U)SIM in the user device and should be kept secret, i.e. a shared secret key. Security information is derived using the secret key. The security information is used for device authentication and/or, in 3G and 4G networks, network authentication and to ensure that data transferred over the radio path is encrypted. For 3G networks, a detailed description can be found in 3GPP TS 33.102; for 4G networks in 3GPP TS 33.401.

The existing 3G and 4G telecommunication standards require the availability of the communication identifiers (e.g. an IMSI or MSISDN related to a user device for voice communication services and SMS services or a SIPURI for SIP communication services) and security information from a central database (e.g. a HLR/AuC or the HSS) to establish a communication service with the terminals in the coverage area of the base station.

A new project has been launched in 3GPP to study Isolated E-UTRAN operation for Public Safety (3GPP TR 22.897). The core network system may be unavailable to the radio access network system (i.e. the radio access network system is isolated) for a variety of reasons. A catastrophic event may have occurred (e.g. an earthquake, flooding, explosion) or hardware or software failures may occur in the telecommunications system. In one particular example, the connection link between one or more base stations (that as such are still able to provide radio coverage for the user devices for one or more communication services) and the core network system may be broken. In one other example, the connection link with the base station is operational, but other parts of the core network do not operate appropriately such that the central database cannot be accessed.

WO 2011/134039 discloses a method of establishing communication lines during a failure within a mobile communications network. A base station may assume a survivability mode if disruptions are detected. In the survivability mode, survivability components may be activated within a base station that enable communications and services to be provided by the base stations. One survivability component includes an authenticator providing authentication and authorization for mobile devices in the coverage area of the base stations. The authenticator survivability component performs the function of the authentication centre AuC of the core network system and stores the secret keys.

This method is disadvantageous from a security perspective. Whereas the AuC element or AuC part of a core network system is a highly secure and rigorously protected environment, this is less so for base stations. Storing the secret key in each base station may therefore endanger communication security.

SUMMARY

As will be appreciated by one skilled in the art, aspects of the present invention may be embodied as a system, method or computer program product. Accordingly, aspects of the present invention may take the form of an entirely hardware embodiment, a software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid-state drive, a random access memory (RAM), a non-volatile memory device, a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless (using electromagnetic and/or optical radiation), wired, optical fiber, cable, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a computer (e.g. a user device) or on a computer facility in a network (e.g. a server in the radio access network system and/or in the core network system), partly on the computer, as a stand-alone software package, partly on the users computer and partly on a computer facility in the network, or entirely on one or more computer facilities in the radio access network system and/or the core network system.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the functions noted in the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In one aspect, the present disclosure presents a security method in a telecommunications network comprising a radio access network system and a core network system. The radio access network system is configured to provide a wireless radio interface for at least one user device. A shared secret key is stored in both the user device and the core network system.

In the disclosed security method, at least one vector is transmitted from the core network system and received by the radio access network system. The at least one vector is formed by a collection of one or more values, wherein one or more of the one or more values have been derived from the secret key in the core network system. An example of such a vector comprises an authentication vector as is known to the skilled person. The radio access network system may store the vector for future use for performing the authentication procedure and/or the key agreement procedure if necessary.

At least one of an authentication procedure and a key agreement procedure is performed in the radio access network system (e.g. in a base station) for or with the user device over the wireless radio interface. One or more values of the vector received from the core network system are used for the authentication and/or key agreement procedure in order to establish a connection between the user device and the radio access network system.

In another aspect of the disclosure, a radio access network system comprising one or more network nodes providing a wireless radio interface for at least one user device and configured to connect to a core network system is presented. In operation of the radio access network, a shared secret is available in the user device and the core network system.

The radio access network system comprises a receiver, configured for receiving, from the core network system, at least one vector comprising one or more values derived from the shared secret key.

The radio access network system may also comprise a storage for storing the vector for future use.

The radio access network system also comprises a processor configured for performing an authentication procedure and/or key agreement procedure for or with the user device over the wireless radio interface using the one or more values of the received vector for establishing a connection between the user device and the radio access network system. The processor may comprise hardware circuitry running a computer program for performing this task.

In yet another aspect of the present disclosure, a computer program or a suite of computer programs is presented that comprises a set of instructions arranged to cause a computer, or a suite of computers, to perform the method.

In a still further aspect of the present disclosure, a computer medium, e.g. a non-transitory computer medium, is presented storing the computer program.

Other aspects of the invention include a core network system and a user device. User devices may not only include mobile devices, such as mobile phones, tablet, smart glasses, smart watches, and laptop computers, etc. but also devices known as machine type communications (MTC) devices (see e.g. 3GPP TS 22.368). Operation of some of the latter devices may also be considered essential by government authorities.

The disclosed aspects enable an authentication and/or key agreement procedure to be performed from the radio access network system (e.g. from a base station, such as a NodeB or an eNodeB), without having to store the shared secret key in the radio access network system. Performing the authentication and/or key agreement procedure from the radio access network system enables a secure connection to be established between the user device and the radio access network system, even if the core network system is not available (the radio access network system is then isolated; the isolated RAN mode). This is advantageous in that the shared secret key does not have to be communicated outside the HLR/AuC or HSS so the security (of the secrecy) of the shared secret key is not compromised.

The invention can also be applied when the core network system is available to the radio access network system but not used for authentication and/or key agreement. An advantage of using the radio access network system, even if the core network system is available, would be that the vector can be pre-loaded in the radio access network system, e.g. during non-busy hours, reducing signalling in the core network during busy hours. Also, the authentication and/or key agreement procedure would be performed faster if the vector is pre-loaded in the radio access network system.

Therefore, in general, the disclosure relates to a RAN only mode, which includes an isolated RAN mode but is not limited thereto.

Whereas generally, authentication and key agreement (also referred to as AKA) are both performed, it should be appreciated that the radio access network as disclosed herein may perform only one of these procedures, e.g. only authentication or only key agreement.

In one example, authentication refers to the verification of the identity of the user device and the network.

In one example, key agreement refers to the procedure to establish at least one key for cryptographically protecting data and/or signalling over the wireless radio interface.

It should also be appreciated that after performing at least one of the authentication procedure and the key agreement procedure, the radio access network system may store the result of these procedure(s) and/or cryptographic keys/parameters for maintaining the secure association between the radio access network system and the user device.

The one or more values transmitted in the vector comprise one or more values derived from the secret key. The secret key itself is not stored in the radio access network system. The number and type of the vector values depends on the generation of the telecommunications system. In general, the vector comprises a security tuple received and, possibly stored, in the radio access network.

It should be noted that multiple vectors may be stored in the radio access network system for a single user device. This enables rekeying even when the core network system is not available.

It should also be noted that other core network functions may also be implemented in the radio access network system, including, but not limited to, SGSN functionality or MME functionality.

For GSM/GPRS network, a triplet vector is generally used to perform AKA. The triplet vector contains a combination of values (RAND, XRES, $K_C$) that is received by and stored in the radio access network system. A secret key K forms the cornerstone for the security mechanisms. The secret key K is stored in the user device (usually on the SIM card) and in the core network system, e.g. in the HLR/AuC. The HLR/AuC generates random number RAND. The RAND and the secret key K are used to derive encryption key $K_C$ using a key generation algorithm and to derive an expected response XRES under an authentication algorithm. The combination (RAND, XRES, $K_C$) forms a GSM authentication vector (triplet) transmitted from the core network system to the radio access network system, e.g. a base station, where the vector is stored.

For UMTS networks, instead of a triplet authentication vector, a quintet authentication vector is generated containing again RAND and expected response XRES together with a cipher key CK, an integrity key IK and an authentication token AUTN, generated from a secret key K. AUTN is generated in a manner known as such. The quintet authentication vector is sent to the radio access network system, e.g. a NodeB, and stored therein.

For 4G Evolved Packet Systems (EPS), the authentication procedure is similar to UMTS networks, although a new key hierarchy is used. The secret key K stored in the USIM at the user device side and the AuC at the core network system side, is used to derive the keys CK and IK. CK and IK, in combination with a serving network ID are used to derive a new key, $K_{ASME}$. From this new key, $K_{ASME}$, other encryption and integrity keys are derived for protection of signalling between the terminal and the core network (key $K_{NASenc}$), protection of integrity between the terminal and the core network (key $K_{NASint}$), the RRC signalling and user data transfer over the radio interface, the latter including encryption key $K_{UPenc}$. The security tuple ($K_{ASME}$, AUTN, XRES and RAND) is transmitted from the core network system to the radio access network system, e.g. to an eNodeB, and stored therein.

Besides 2G, 3G and 4G, the invention may be used in other networks that comprise an access network system, and a core network system wherein keys are derived from a shared secret key. Such networks may comprise potentially 5G and further generation mobile networks.

Also it should be appreciated and it will be understood by a skilled person, that the invention and many embodiments thereof may be used in a network wherein the radio access network system is part of a roaming network (FPLMN) and the core network system is part of a home network (HPLMN), for example in order to support user devices that roam on the roaming network when the home core network, or elements thereof that are critical for roaming, e.g. the HLR, are not available.

Several vectors, e.g. copies of vectors, for a single user device may be stored at multiple locations in the radio access network system to increase the probability that a vector is available for a user device when needed. A control entity may be provided in the radio access network, e.g. in a dedicated eNodeB, to ensure that a vector is disabled from being used once the vector has been used for authentication and/or key agreement.

In an embodiment, the method comprises the step of detecting an inability to handle the at least one of the authentication procedure and the key agreement procedure from the core network system. To that end, the radio access network system comprises a detector detecting information indicative of the inability. The detector may e.g. detect information indicative of the isolation of the radio access network system. The information may be received from an external system. The information may also be obtained by a base station detecting a disconnection between the base station and the core network system. Information indicative of a disconnection may comprise the absence of information that would be received in case of an operative connection or error messages indicating malfunction of the core network system or subsystems thereof. For example, the base station may detect the absence of acknowledgements on messages sent to the core network. In that case, the absence of the acknowledgement(s) indicates the disconnection with the core network system. Detection of the inability may also refer to an inability to handle AKA procedures from the core network system because of e.g. dysfunctional elements or nodes, such as a HSS.

The at least one vector is transmitted from the core network system and received and stored in the radio access network system prior to detecting the disconnection. This implies that during normal operation of the telecommunications network (wherein the radio access network system and the core network system are connected or when the nodes responsible for AKA procedure are operational and able to communicate with the radio access network system), the at least one vector should be transmitted at least once to the radio access network system and stored therein.

As long as AKA procedures can be handled from the core network system, AKA may be performed from the core network system. After detecting the inability, the authentication procedure and/or key agreement procedure using the one or more values of the received vector is performed from the radio access network system.

If other communication service functions are also implemented in the radio access network system, user devices may communicate using the radio access network system in a secure manner. One embodiment of implementing communication service functionality in the radio access network is storing at least one communication identifier in the radio access network system, e.g. after detecting disconnection between the radio access network system and the core network system, the communication identifier enabling a communication service to be established for the user device.

By implementing a local database in the radio access network system to store at least one communication identifier of the user device, the radio access network system has access to the local storage to access the communication identifier (and, possibly, information associated with that communication identifier) when needed to establish a communication service associated with that communication identifier without requiring access to the central database in the core network system. In other words, when for some reason, a connection with the central database cannot be made, wireless communication services can still be provided through the base station having access to the local storage with regard to user devices for which one or more communication identifiers are stored in the local storage. When the connection between the base station and the core network system is not operative, the local storage provides a means to emulate (part of) the functionality of the core network system. The at least one communication identifier may be received from the user device once disconnection from the core network is detected in the radio access network system. An advantage of not pre-storing the at least one communication identifier, is that the communication identifiers in the local storage do not have to be updated and maintained during normal operation.

Typical examples of communication identifiers include identifiers for voice communication services and/or data communication services. These identifiers are user-level communication identifiers, i.e. identifiers that users typically use to establish a communication service with a user device. For example, the communication identifier(s) may include an IMSI or MSISDN related to a user device for voice communication services and SMS services or a SIPURI for SIP communication services.

In order to avoid transmission and storage of communication identifiers and/or vectors for potentially all user devices, an embodiment involves pre-storage of an indication (also referred to as a radio access network (RAN) only subscription indication) that is associated with at least one user device in the core network system to indicate that for this user device, the at least one vector should be transmitted to the radio access network system. For a user device not having been assigned a RAN only subscription indication, the vector is not transmitted to and stored in the radio access network system.

In one aspect, the present disclosure presents a core network system configured for operating with the radio access network system. The core network system comprises a register, a processor and a transmitter. The register is configured for storing the RAN only subscription indication associated with the user device indicating that the vector should be transmitted to the radio access network system, e.g. for storage in the radio access network system. The processor is configured for controlling transmission of the vector for the user device only if the register has a pre-stored RAN only subscription indication. The transmitter is controlled by the processor and is configured to transmit the vector to the radio access network system.

The RAN only subscription indication enables a specific subscription with a telecommunications operator for secure communication if the radio access network system is isolated. Such a subscription would e.g. be interesting for emergency workers, critical personnel, critical machine-to-machine applications etc.

In an embodiment, the at least one vector (preferably with different values) is received periodically from the core network system and stored in the radio access network system. In response to receiving one or more new vectors, one or more older vectors may be deleted.

In an embodiment, an indication may be transmitted (e.g. using a cell broadcast message) from the radio access network system to indicate that the radio access network system will be performing at least one of the authentication procedure and the key agreement procedure for services obtained from the radio access network system. This embodiment ensures that user devices operating using the radio access network system in RAN-only mode, e.g. when isolated from the core network system, are authorized to use these services and may communicate with the radio access network in a secure manner. The indication may be referred to as a RAN-only indication. This indication may be a radio access network system initiated indication.

In an embodiment, the radio access network system comprises at least a first node and a second node, communicatively connected to the first node. A request for establishing a connection may be received from the user device at the first node. The authentication procedure and/or key agreement procedure may however be performed at a second node that has access to the stored vector. The first and second nodes may be different base stations, e.g. (e)NodeBs. The base stations are in communicative connection (either directly using e.g. the X2 interface or indirectly). The embodiment facilitates that not every node of the radio access network system should implement a storage for vectors and/or be able to perform authentication procedure and/or a key agreement procedure.

For such distributed systems wherein the node of the radio access network system performing the disclosed method is different from the one or more nodes providing the wireless radio interface for the user device at a particular moment, a mechanism has been envisaged for discovering the node having access to the stored vector and/or being configured to perform the AKA procedure.

In one embodiment, the user device may transmit an indication to the radio access network system of the location for accessing the at least one vector. The location indication(s) may be obtained by the user device in various manners, e.g. by storing the location indication in the user device or on a memory card or by informing the user device from the radio access network system or from the core network system, e.g. comprised in a cell broadcast message). The location indication may be received at the radio access network system when connecting to the radio access network system, e.g. in an Attach Request or Tracking Area Update (TAU) Request.

In another embodiment, a node of the radio access network system records the address of another node of the radio access system that stores the vector and/or is configured for performing the AKA procedure. For example, one base station per location area or routing area may be given additional functionality to keep track of addresses where vectors are stored for particular user devices. That base station may then be queried from e.g. the first node to inform the first node that the vector is available at the second node.

In yet another embodiment, the first node may broadcast a request in the radio access network system (e.g. over the X2 interfaces) for the node that holds the vector.

In order to enhance security even further, in one embodiment, the vectors may be received only in nodes of the radio access network designated as trusted nodes, e.g. because these nodes are physically located in secured locations (e.g. indoor locations), whereas other nodes may be in relatively unsecure outdoor locations.

In another embodiment, the values of the vector received and stored in the radio access network system may comprise one or more values that are non-operable as long as the core network system is available to perform the AKA procedure. This may be indicated by signalling. For example, the vector may contain a flag indicating that the values are only for the case of a RAN-only mode. In one embodiment, the AKA parameter AMF may be used for this type of signalling. The RAN-only mode may be indicated in e.g. a PLMN indication. When the USIM of a user device receives the AMF parameter it could check whether the RAN-only mode indicator (e.g. sent with the PLMN indication) that it is in RAN-only mode. If the RAN-only mode indicator is not set and the AMF parameter is not set, conventional AKA is performed with the core network system. If the RAN-only mode indicator is not set but the AMF parameter is set, the user device should not authenticate the network. In this case, a false base station attack may have happened. The user device may be configured, e.g. programmed, to only authenticate the radio access network system using one or more values of the vector having the signalling message when the RAN-only mode is detected.

In an embodiment, one or more vectors are refreshed in the radio access network system for performing the at least one of the authentication procedure and the key agreement procedure. This permits renewal of vectors from the radio access network system. The one or more vectors that are refreshed may comprise vectors that have been used and/or vectors that have remained unused for authentication and/or key agreement. It should be noted that, in RAN-only mode, the refreshing procedure cannot proceed, and then vectors may be deliberately maintained for use longer, e.g. as long as the RAN is operating in isolation. This may e.g. be advantageous for long lasting problems regarding the availability of the core network system.

In one aspect of the disclosure, the user device is adapted to cooperate in the method and radio access network system disclosed herein. For example, the user device may be configured for processing the RAN-only indication and/or the location indication of the node in the radio access network system storing the vector and/or a signalling message indicating that one or more values of the vector are non-operable for performing the authentication procedure and/or the key agreement procedure when the core network system is able to perform the authentication procedure and the key agreement procedure.

The user device may receive the RAN-only indication that authentication procedure and/or key agreement procedure will be performed by the radio access network system and, possibly, that only limited services are available. In one embodiment, the user device may be controlled to be limited to only certain services, e.g. by being disabled to request other services that would normally be available using the core network system. In order to use the set of services offered by the radio access network system, the user device is informed that authentication with the radio access network system is required to access the services offered by the radio access network system. In another embodiment, the user device may process a location indication indicating that the vector is available at a particular node of the radio access network system. For example, the user device may receive the location indication and be configured to store the location indication at a particular address in the user device such that it can be applied when necessary. For example, if the user device receives the RAN-only indication from the radio access network system, the user device may request to attach to the radio access network system, retrieve the location indication from the address where it is stored and include the location indication in the request to inform the radio access network where the at least one vector is available.

In a still other embodiment, the user device is configured to process a signalling message indicating that one or more values of the vector are non-operable for performing the authentication procedure and/or the key agreement procedure when the core network system is able to perform the authentication procedure and the key agreement procedure. For example, the user device may be configured, e.g. programmed, to only authenticate the radio access network system using one or more values of the vector if the signalling message indicates that the one or more values are valid in RAN-only mode and a RAN-only mode is indicated by the radio access network system.

It is noted that the invention relates to all possible combinations of features recited in the claims.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1:
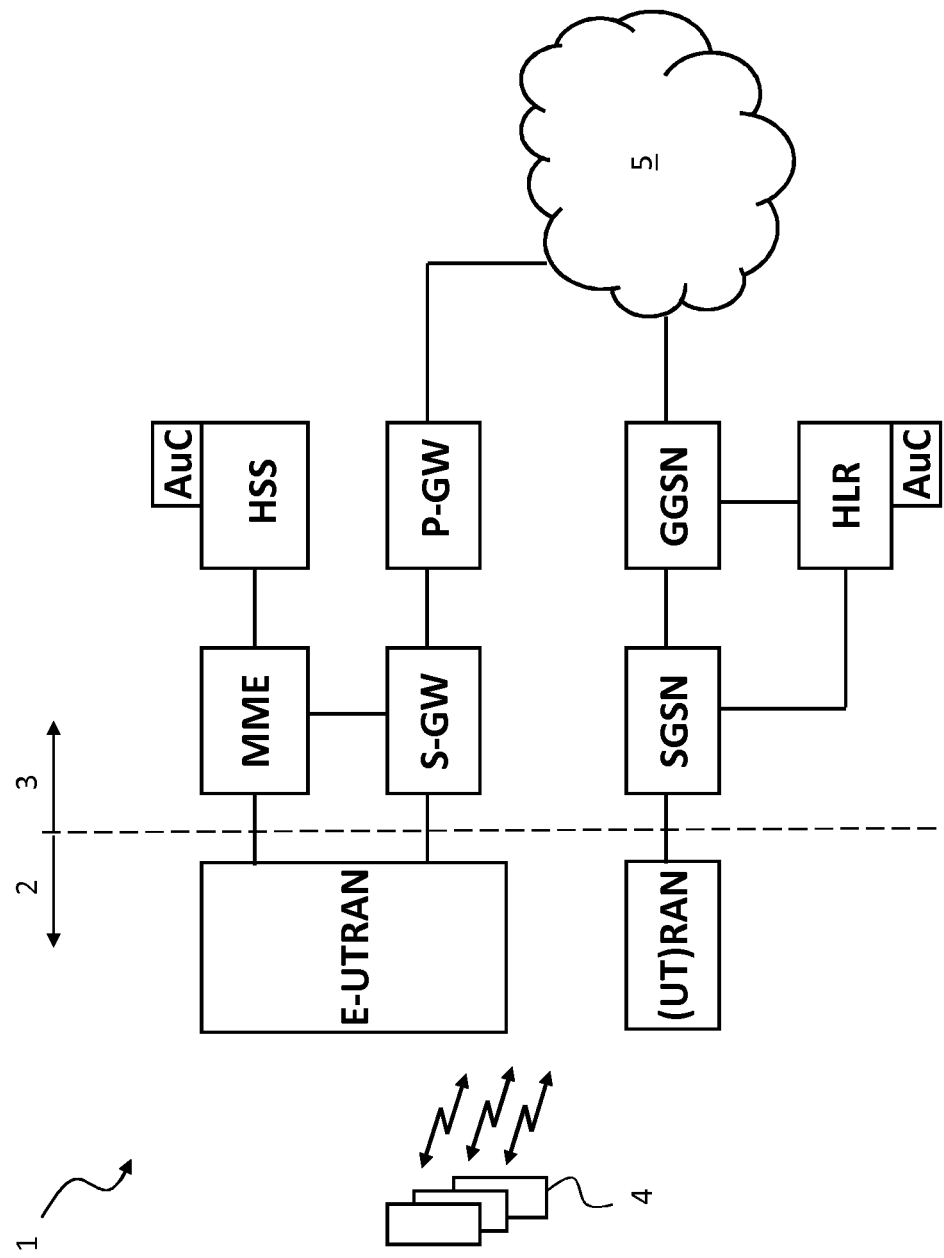
FIG. 1 is a schematic illustration of a telecommunications system comprising a radio access network system and a core network system.

FIG. 1 shows a schematic illustration of a telecommunications system 1. The telecommunications system 1 comprises a radio access network system 2 (also indicated as E-UTRAN or RAN in FIG. 1) and a control network system 3 containing various elements or nodes as described in further detail below.

In the telecommunications system of FIG. 1, three generations of networks are schematically depicted together for purposes of brevity. A more detailed description of the architecture and overview can be found in 3GPP TS 23.002 which is included in the present application by reference in its entirety.

The lower branch of FIG. 1 represents a GPRS or UMTS network.

For a GSM/GPRS network, a radio access network system 2 comprises a plurality of base stations (combination of a BSC and a BTS) and one or more Radio Network Controllers (RNCs), not shown individually in FIG. 1. The core network system 3 comprises a Gateway GPRS Support Node (GGSN), a Serving GPRS Support Node (SGSN, for GPRS) or Mobile Switching Centre (MSC, for GSM, not shown in FIG. 1), a Home Location Register (HLR) combined with an Authentication Centre (AuC). The HLR contains subscription information for user devices 4 and the AuC contains a secret key to be used for authentication and key agreement (AKA) procedures.

For a UMTS radio access network (UTRAN), the radio access network system 2 also comprises a Radio Network Controller (RNC) connected to a plurality of NodeBs, also not shown. In the core network system 3, the GGSN and the SGSN/MSC are conventionally connected to the HLR/AuC that contains subscription information and secret keys of the user devices 4.

It should be noted that the RNC functionality in GSM and UMTS networks is formally part of the RAN. The RNC functionality may be implemented in one or more base stations. Such a configuration is known as a collapsed architecture.

The upper branch in FIG. 1 represents a next generation network, commonly indicated as Long Term Evolution (LTE) system or Evolved Packet System (EPS).

The radio access network system 2, indicated as E-UTRAN, comprises evolved NodeBs (eNodeBs or eNBs) providing wireless access for a device 3. The core network system 3 comprises a PDN Gateway (P-GW) and a Serving Gateway (S-GW). The E-UTRAN of the EPS is connected to the S-GW via a packet network. The S-GW is connected to a Home Subscriber Server HSS and a Mobility Management Entity MME for signalling purposes. The HSS includes a subscription profile repository SPR and is combined with an Authentication Centre (AuC) that stores a secret key for AKA procedures.

For GPRS, UMTS and LTE systems, the core network system 3 is generally connected to a further packet network 5, e.g. the internet.

Further information of the general architecture of a EPS network can be found in 3GPP TS 23.401.

Of course, architectures other than defined by 3GGP, e.g. WiMAX, can also be used within the context of the present disclosure.

Figure 2:
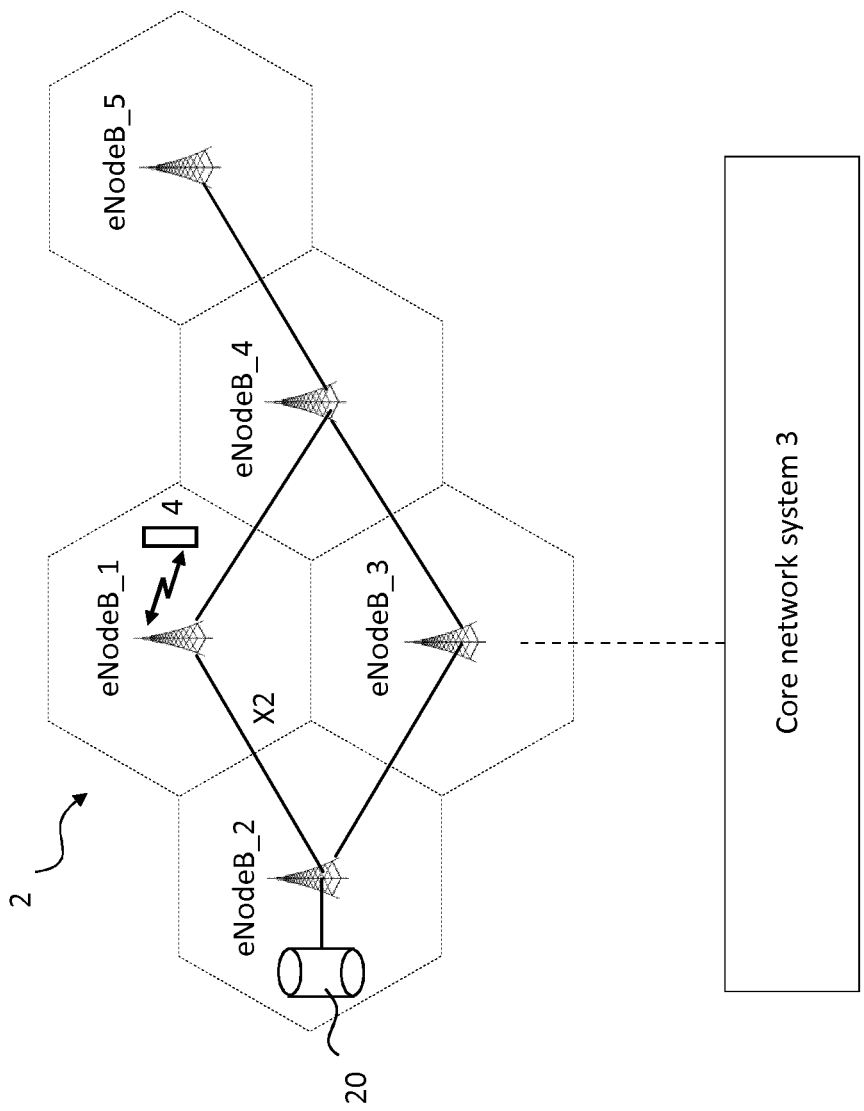
FIG. 2 is another schematic illustration of a telecommunications system, wherein the radio access network system is isolated from the core network system.

FIG. 2 is a schematic illustration of a 2G, 3G or 4G telecommunications system 1 containing a radio access network system 2 and a core network system 3. The radio access network system 3 comprises five eNodeBs that at some moment in time have become isolated from the core network system 3. The eNodeBs 5 may be connected to each other via X2 interfaces. It should be noted that the method and system as disclosed herein may as well be performed when the radio access network system 2 remains to be connected to the core network system 3.

The radio access network system 2 comprises a storage 20, e.g. a database. In the embodiment of FIG. 2, the storage 20 is associated with eNodeB_2, i.e. can be accessed by eNodeB_2. It should be appreciated that other embodiments include each base station having its own storage or a shared storage to be accessible by all base stations alike. Storage 20 may store at least one of a communication identifier and one or more vectors to be used for authentication and/or key agreement for a user device 4. As illustrated in FIG. 2, user device 4 is not necessarily in the cell provided by eNodeB_2.

Figure 3B:
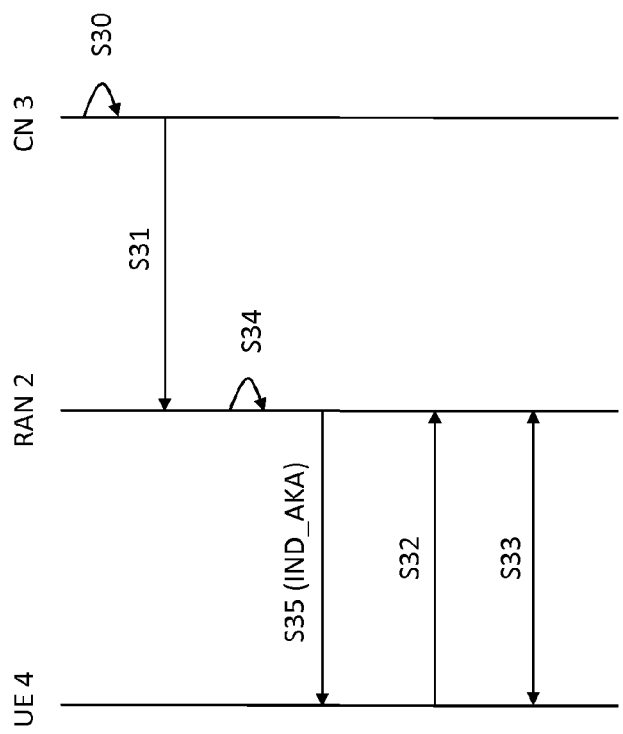
FIGS. 3A-3C are basic time diagrams illustrating embodiments of the disclosed method.
Figure 3A:
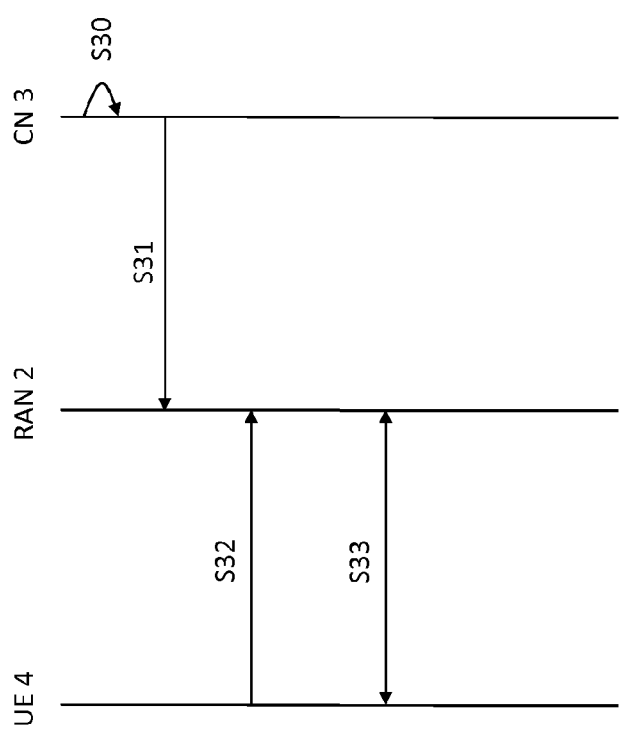
Figure 3C:
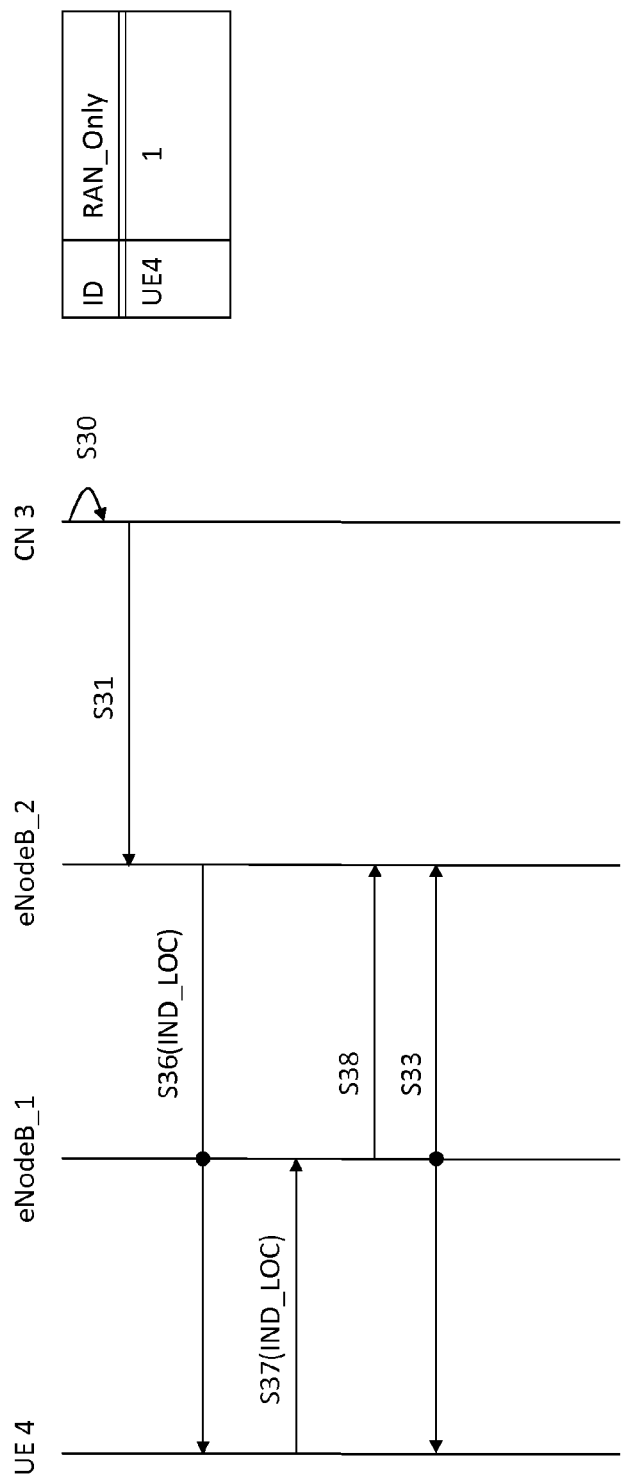

FIGS. 3A-3C are basic flow charts illustrating embodiments of the disclosed method.

In FIG. 3A, step S30 represents the generation of a vector for authentication and/or key agreement purposes in the core network system 3. The vector is transmitted from the core network system 3 to the radio access network system 2 in step S31 and may be stored therein, e.g. in storage 20 associated with one or more base stations, to apply in a RAN-only mode of operation. In step S32, the radio access network system 2 receives a connection request, e.g. an Attach Request. In response to receiving the connection request, an AKA procedure is performed in step S33 from the radio access network system 2 for user device UE 4 using the vector received and stored in step S31.

In FIG. 3B, step S30 again represents the generation of a vector for authentication and/or key agreement purposes in the core network system 3. The vector is transmitted from the core network system 3 to the radio access network system 2 in step S31 and stored therein, e.g. in storage 20 associated with one or more base stations.

In step S34, the radio access network system 2 detects disconnection from or malfunction of the core network system 3. The radio access network system is now in a RAN-only mode, more specifically, in an isolated RAN mode. It should be noted that if a neighbouring base station is able to connect to the core network system 3 for performing AKA procedures, the method disclosed herein should not necessarily be applied, since AKA procedures may be carried out via routing over the neighbouring base station.

In response to the detection of unavailability of the core network system 3, the radio access network system transmits a message, e.g. a broadcast message, in step S35 comprising a RAN-only indication, in this embodiment IND_RAN-only, indicating that the radio access network system is operating in RAN-only mode. The indication may comprise a more specific indication that the RAN-only mode refers to an isolated RAN mode. The RAN-only indication may contain an indication that the radio access network system requires a new authentication and/or key agreement procedure to be performed, e.g. in order to get access to the service provided in the RAN-only mode or the isolated RAN mode. A distinction may be made, dependent on whether the RAN-only mode applies or that the more specific isolated RAN mode applies. In the latter case, authentication for using more services from the radio access network system may be provided, e.g. also making use of a storage in the radio access network system containing communication identifiers, than when the more general RAN-only mode applies. The user device detects the indication IND_RAN-only and this triggers the request S32 to the radio access network system for the new authentication and/or key agreement procedure in step S33 for using RAN-only (or isolated RAN) services, again using the vector received and stored in step 31 of FIG. 3B.

In FIG. 3C, an element of the core network system 3, e.g. the HLR or HSS, comprises a register with subscriber information. The register comprises a RAN-only subscription indication associated with a user device UE 4. The RAN-only subscription indication indicates (in this embodiment by a single value set to '1') that for that particular user device UE 4, an authentication and/or key agreement procedure to be performed in the radio access network should be enabled and that, as a consequence thereof, the vector derived from the secret key associated with the user device UE 4, should be transmitted to the radio access network system 3.

In accordance with the RAN-only subscription indication, the vector generated in step S30, is transmitted from the core network system 3 to the radio access network system 2 and stored therein, for example but not necessarily in storage 20 associated with one or more base stations. For a user device not having been assigned a RAN-only subscription indication in the register, the vector is not transmitted to and stored in the radio access network system. The RAN only indication enables a specific subscription with a telecommunications operator for secure communication if the radio access network system 2 operates in RAN-only mode, e.g. because the radio access network system is isolated from the core network system. Such a subscription would e.g. be interesting for emergency workers, critical personnel, critical machine-to-machine applications etc.

In the embodiment of FIG. 3C, the vector is stored in storage 20 of eNodeB_2 of the system shown in FIG. 2. In step S36, the user device UE 4 is informed of the address of eNodeB_2 by means of an indication IND_LOC. It should be appreciated that alternatives have been envisaged for informing UE 4 of the location of the vector in the radio access network system 2. In one embodiment, UE 4 is informed about the base station having access to the vector from the core network system 3, e.g. using an SMS facility. In another embodiment, which may be particularly suitable for substantially stationary user devices and/or for MTC devices, the location indication may be pre-stored in the user device UE 4.

In step S37, user device UE 4 transmits an access request to the radio access network system 2, in particular to eNodeB_1 that provides cell coverage for user device UE 4. UE 4 is configured to inform the radio access network system 2 of the location of the vector in the radio access network system required to perform the authentication and/or key agreement procedure. In one embodiment, location indication LOC_IND is transmitted with or is part of the access request. The radio access network system 2 receives the location indication LOC_IND and is configured to resolve the address of the base station that has access to the vector. It is noted that UE 4 may inform the radio access network system 2 in another manner of the location indication (e.g. in a dedicated message not being part of an access request).

In the embodiment of FIG. 3C, eNodeB_1 is enabled to find out from the location indication LOC_IND received in step S37 that the vector associated with UE 4 is with eNodeB_2. The base stations eNodeB_1 and eNodeB_2 are in communicative connection (either directly using e.g. the X2 interface (see FIG. 2) or indirectly). The embodiment facilitates that not every node of the radio access network system 2 should implement a storage for vectors and/or be able to perform authentication procedure and/or a key agreement procedure.

In step S38, eNodeB_1 informs eNodeB_2 that an authentication procedure and/or a key agreement procedure should be performed for UE 4. The procedure is performed in step S33 between eNodeB_2 and UE 4 using eNodeB_1 as an intermediary node.

It should be noted that, whereas in the embodiments of FIGS. 3A-3C the vector is stored in the radio access network system 2, this is not required. In the embodiments of FIGS. 3A and 3C, for example, the radio access network system 2 (e.g. a base station such as eNodeB_2), may receive the vector from the core network system 3 (e.g. from the HLR/AuC or the HSS from the same telecommunications network 1) and use the vector to perform an on-the-fly authentication procedure and/or key agreement procedure for a user device.

In one embodiment, the radio access network system 2 may contain or store more information than the vector for authentication and/or key agreement purposes. For example, at least one communication identifier may also be stored in the radio access network system 2, e.g. in storage 20. The communication identifier enables a communication service to be established for or with the user device. By implementing a local storage in the radio access network system 2 to store at least one communication identifier of the user device 4, the radio access network system 2 has access to the storage to access the communication identifier (and, possibly, information associated with that communication identifier) when needed to establish a communication service associated with that communication identifier without requiring access to the core network system 2. In other words, when for some reason, a connection with the core network system 2 cannot be made, wireless communication services can still be provided through the isolated radio access network system having access to the storage with regard to user devices for which one or more communication identifiers are stored in the local storage. When the connection between the radio access network system 2 and the core network system 3 is not operative or there is a malfunction of (an element of) the core network system 3, the local storage provides a means to emulate (part of) the functionality of the core network system 2. The at least one communication identifier may be received from the user device 4 either before or after disconnection from or malfunction of the core network system 3. Alternatively or additionally, the at least one communication identifier may be pre-loaded from the core network system 3 to the local storage.

Typical examples of communication identifiers include identifiers for voice communication services and/or data communication services. These identifiers are user-level communication identifiers, i.e. identifiers that users typically use to establish a communication service with a user device. For example, the communication identifier(s) may include an IMSI or MSISDN related to a user device for voice communication services and SMS services or a SIPURI for SIP communication services. It should be noted that in the embodiments of FIGS. 3A-3C, step S31 may be performed more than once, e.g. periodically. The vectors transmitted for a single user device may be different. In response to receiving one or more new vectors in the radio access network system 2, one or more older vectors may be deleted. This permits renewal of vectors from the radio access network system 2. The one or more vectors that are refreshed may comprise vectors that have remained unused for authentication and/or key agreement. It should be noted that, in an alternative embodiment, vectors are maintained for use. This may e.g. be advantageous for long lasting problems regarding the availability of the core network system 3.

It should also be noted that other alternatives than the embodiment of FIG. 3C have been envisaged for resolving the location of the vector in distributed systems wherein the node of the radio access network system 2 performing the disclosed method is different from the one or more nodes providing the wireless radio interface for the user device 4 at a particular moment.

In one embodiment, a node (e.g. eNodeB_3 in FIG. 2) of the radio access network system 2 records the address of another node of the radio access network system that stores the vector and/or is configured for performing the authentication and/or key agreement procedure, e.g. eNodeB_2 in FIG. 2. eNodeB_3 may function as a super node for a particular location area or routing area given the additional functionality to keep track of addresses where vectors are stored for particular user devices. That base station eNodeB_3 may then be queried from e.g. eNodeB_1 providing the wireless access to inform the first node eNodeB_1 that the vector is available at eNodeB_2.

In yet another embodiment, the first node eNodeB_1 may broadcast a request in the radio access network system (e.g. over the X2 interfaces) for the node that holds the vector and receive a response from second node eNodeB_2.

In order to enhance security even further, in one embodiment, the vectors may be received only in nodes of the radio access network 2 designated as trusted nodes, e.g. because these nodes are physically located in secured locations (e.g. indoor locations), whereas other nodes may be in relatively unsecure outdoor locations. For example, in FIG. 2, eNodeB_2 may be a trusted node housed in a secure environment relative to the other base stations, while eNodeB_2 still also provides radio coverage for user devices.

Several vectors, e.g. copies of vectors, for a single user device 4 may be stored at multiple locations in the radio access network system 2 to increase the probability that a vector is available for a user device 4 when needed. For example, vectors for a single user device may be stored such that they can be accessed for each of the base stations in the radio access network system 2, e.g. for each of eNodeB_1, eNodeB_2, eNodeB_3, eNodeB_4 and eNodeB_5 in FIG. 2.

Next, more detailed embodiments will be described with reference to FIGS. 4-7. In these figures, the abbreviation 'AV' stands for Authentication Vector, a term used in the art to designate the security tuple used in AKA procedures.

Figure 4:
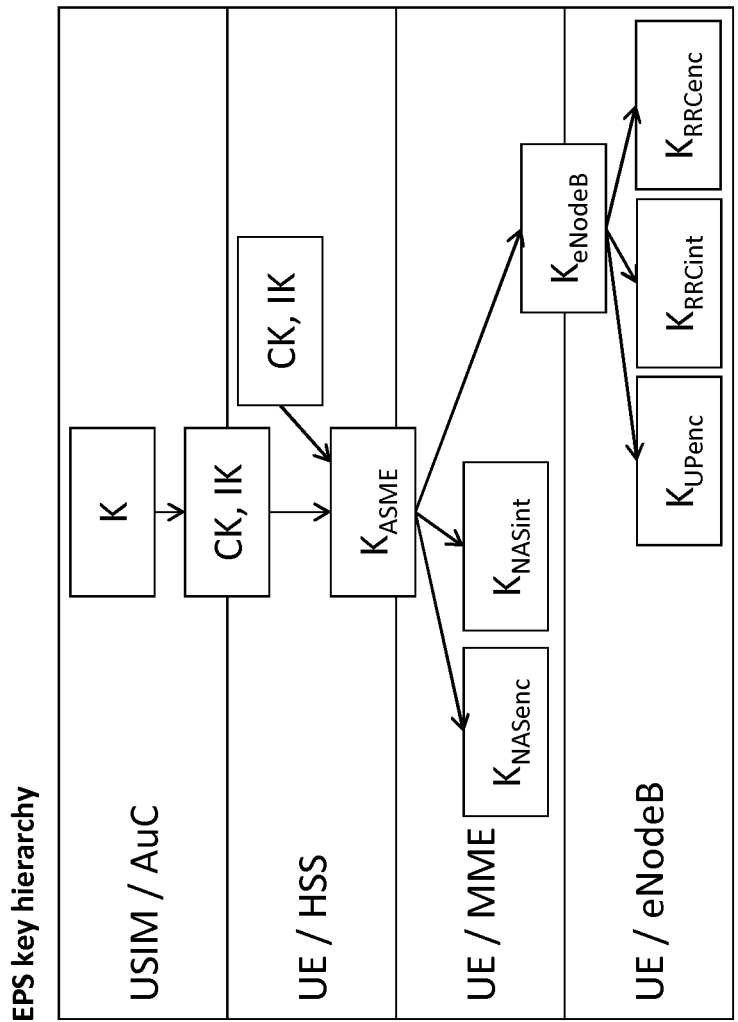
FIG. 4 depicts a key hierarchy for an LTE telecommunications system.
Figure 5:
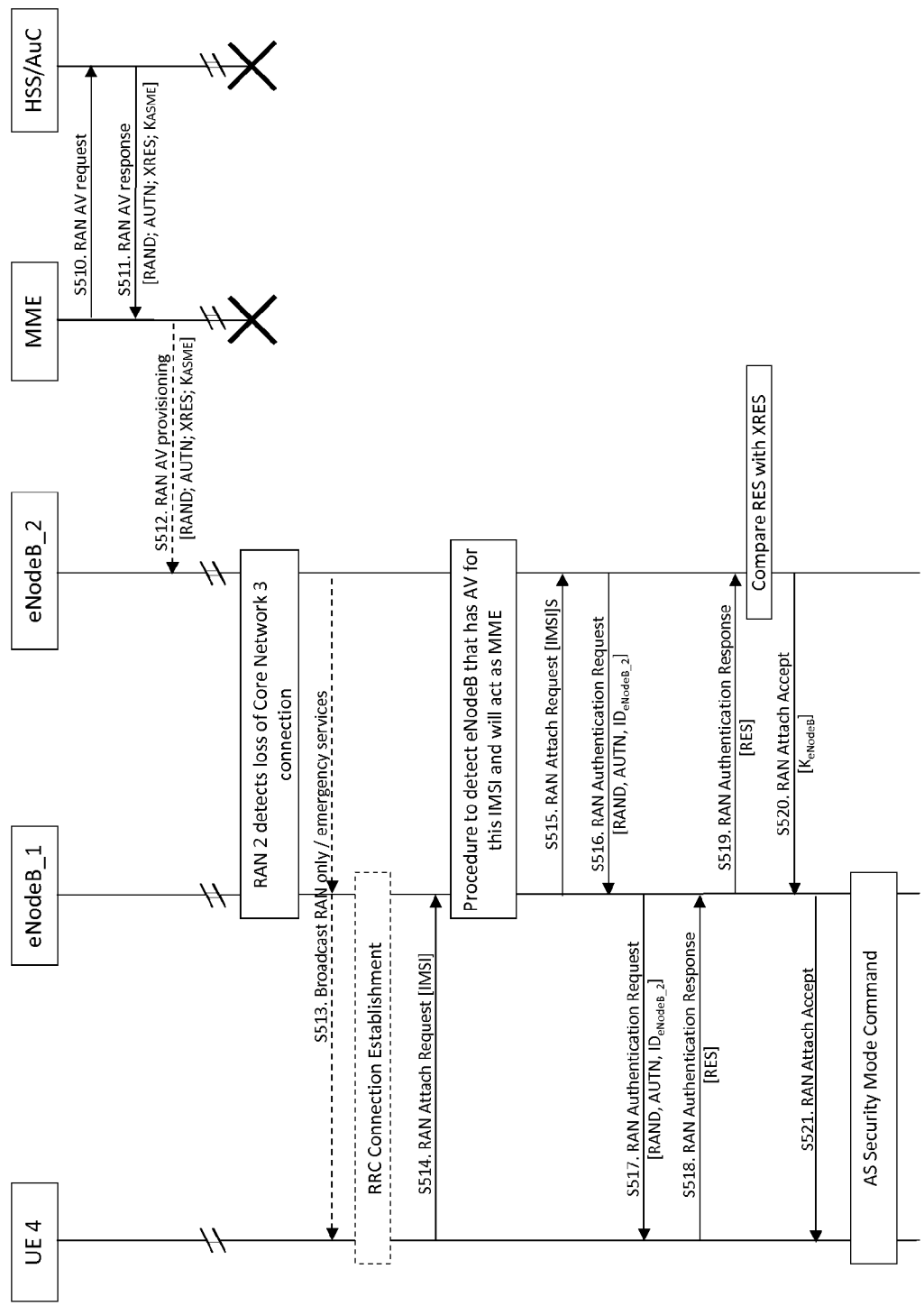
FIG. 5 depicts a more detailed time diagram for performing an authentication and key agreement procedure in an LTE telecommunications system as illustrated in FIG. 1 in accordance with an embodiment of the disclosed method.

FIGS. 4 and 5 apply to an LTE telecommunications system 1.

FIG. 4 is a schematic illustration of a key hierarchy for an LTE telecommunications network.

A secret key K is provided in both the HSS/AuC of the core network system 3 and in the user device 4, more specifically on a USIM card of the user device 4. An integrity key IK and cipher key CK are generated from secret key K in both the user device 4 and the core network system (more specifically, the authentication centre AuC) and, subsequently, a key $K_{ASME}$ is generated from integrity key IK, cipher key CK and a serving network id in a known manner. From the generated key $K_{ASME}$, keys for the protection of NAS signalling, RRC signalling and user plane communication on the radio interface are generated, as illustrated in FIG. 4.

The NAS keys $K_{NASenc}$ en $K_{NASint}$ are used for encryption of session management. Keys $K_{UPenc}$, $K_{RRCint}$, en $K_{RRCenc}$ are used at the radio interface between the UE and the base station eNodeB. These keys are derived using an intermediate key $K_{eNB}$. The $K_{RRC}$ keys are access stratum keys used for the radio resources signalling. User plane key $K_{UP}$ is used for encryption of the (user plane) traffic on the radio interface.

FIG. 5 depicts a time diagram for performing an authentication and key agreement procedure in an LTE telecommunications system as illustrated in FIG. 1.

In step S510, the MME requests the HSS/AuC to generate an AV using the secret key K for use in RAN-only mode. In step S511, HSS/AuC transmits a response in the form of an AV containing RAND, AUTN, XRES and $K_{ASME}$ (AUTN, XRES and $K_{ASME}$ are derived using secret key K). This security tuple is transmitted to the radio access network system 2, here eNodeB_2, and stored there in step S512. This process may be repeated from time to time, e.g. periodically. The frequency of updating the vector in the radio access network system may be dependent on the mobility of the UE 4. One or more vectors may be provided for a UE 4. Transmission of a single vector saves storage resources in the radio access network system 2 and reduces signalling overhead in the telecommunications network 1. Transmission of multiple vectors facilitates rekeying from the radio access network system 2 independent of the availability of the core network system 3. The transmission of the vector(s) may be included in existing S1-MME signalling messages (e.g. in a Path Switch Request or in a UE initial context setup request), but a dedicated message may also be used for this purpose.

At a particular moment in time, the radio access network system 2 detects a loss of the connection with the core network system 3 as described above. In step S513, a broadcast is transmitted from the radio access network system 2 to inform the user devices 4 of the RAN-only mode or, more specifically, the isolated RAN mode. The RAN_only mode signals e.g. to the user devices 4 that when attaching to the RAN an AKA is to be performed from the radio access network system 2 (and not from the core network system 3) and, possibly, that limited services are available. Instead of a broadcast message, the UE 4 may be informed by the radio access network system 2 in another manner, e.g. in response to an RRC Connection Request.

After establishing an RRC connection, an Attach Request is received at the radio access network system 2, i.e. at eNodeB_1 in the present embodiment. The Attach Request contains the IMSI of the user device 4 to identify the user device. Other communication identifiers may also be provided and stored in the radio access network system 2 to enable communication services to be established without access to the core network system 3.

Subsequently, one of the alternatives described above may be applied to detect the eNodeB that has access to the AV for performing the AKA procedure. After resolving that eNodeB_2 has access to the AV, eNodeB_1 forwards the Attach Request to eNodeB_2 together with the IMSI or IMSIs for which the AV should be processed for the AKA procedure. eNodeB_2 may function as an MME.

Steps S516 and S517 indicate the transmission of RAND, AUTN and, optionally, an identifier of the node performing the AKA from eNodeB_2 via eNodeB_1 to the UE 4. The node identifier may be used by the UE 4 to re-access the radio access network system 2 when it has been in the idle state (ECM-IDLE) such that eNodeB_2 does not have to be rediscovered in the radio access network system 2 when re-access takes place.

Step S518 indicates the computed response RES from the UE 4 using RAND and the secret key K stored in the UE4. In step S519, the response RES is forwarded to eNodeB_2. If eNodeB-2 finds that RES matches XRES, UE 4 is authenticated and an Attach Accept is generated and transmitted for UE 4 in steps S520 and S521. In step S20, key $K_{eNodeB}$ (derived from $K_{ASME}$ in eNodeB_2) is received in eNodeB_1 to compute keys $K_{UPenc}$, $K_{RRCint}$, and $K_{RRCenc}$ to be used at the radio interface between the UE and the base station eNodeB_1. An Access Stratum (AS) security mode is then entered, wherein the communication between the user device UE 4 and eNodeB_1 will be cryptographically protected using the keys $K_{UPenc}$, $K_{RRCint}$, and $K_{RRCenc}$ and the cryptographic algorithms indicated in the AS Security Mode Command. Non Access Stratum (NAS) security is provided using NAS keys $K_{NASenc}$ en $K_{NASint}$ between user device UE 4 and eNodeB_2, the latter having MME functionality.

For the AS keys the normal operation applies with regard to preserving the validity of the security context. In addition, after ECM-CONNECTED to ECM-IDLE transition the AS security context is deleted. After handover a new $K_{eNodeB}$ is established for the target eNodeB. For the $K_{ASME}$ in the AV, there are more options. In one embodiment, during the RAN-only mode, the validity of the AV may be set not to expire, such that the NAS security context stays current and is stored in both UE 4 and the eNodeB_2. In another embodiment, multiple AVs may be used normal procedures can be applied for determining when a new AKA procedure is initiated. A procedure may be used to determine when eNodeB_2 runs out of AVs.

Handovers may still be performed, including Inter-eNodeB handovers (X2 handovers, intra-MME handovers). The source eNodeB may inform the target eNodeB of the address of the eNodeB serving as MME for this UE, in this case eNodeB_2. The target eNodeB can also send a Path Switch Request to the eNodeB acting as the MME. This eNodeB can provide the target eNodeB with a new NH, NCC to ensure forward secrecy for the next handover, as specified in 3GPP TS 33.401.

Figure 6:
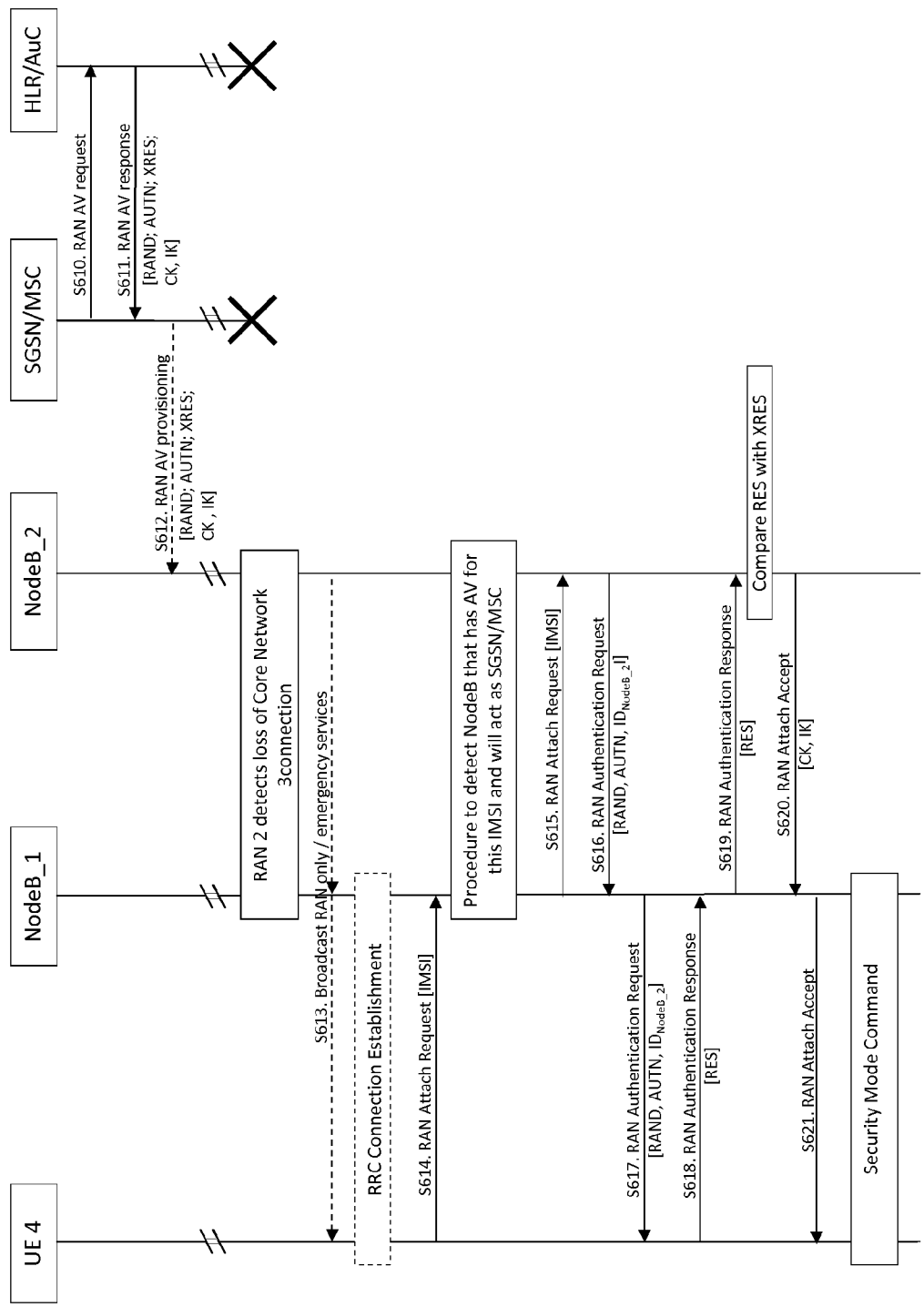
FIG. 6 depicts a more detailed time diagram for performing an authentication and key agreement procedure in a UMTS telecommunications system as illustrated in FIG. 1 in accordance with an embodiment of the disclosed method.

FIG. 6 depicts a time diagram for performing an authentication and key agreement procedure in a UMTS telecommunications system as illustrated in FIG. 1. Steps S610-S621 are similar to steps S510-S521, although different AV's and a different key hierarchy are used. For UMTS, AUTN, XRES, CK and IK are derived using secret key K.

Figure 7:
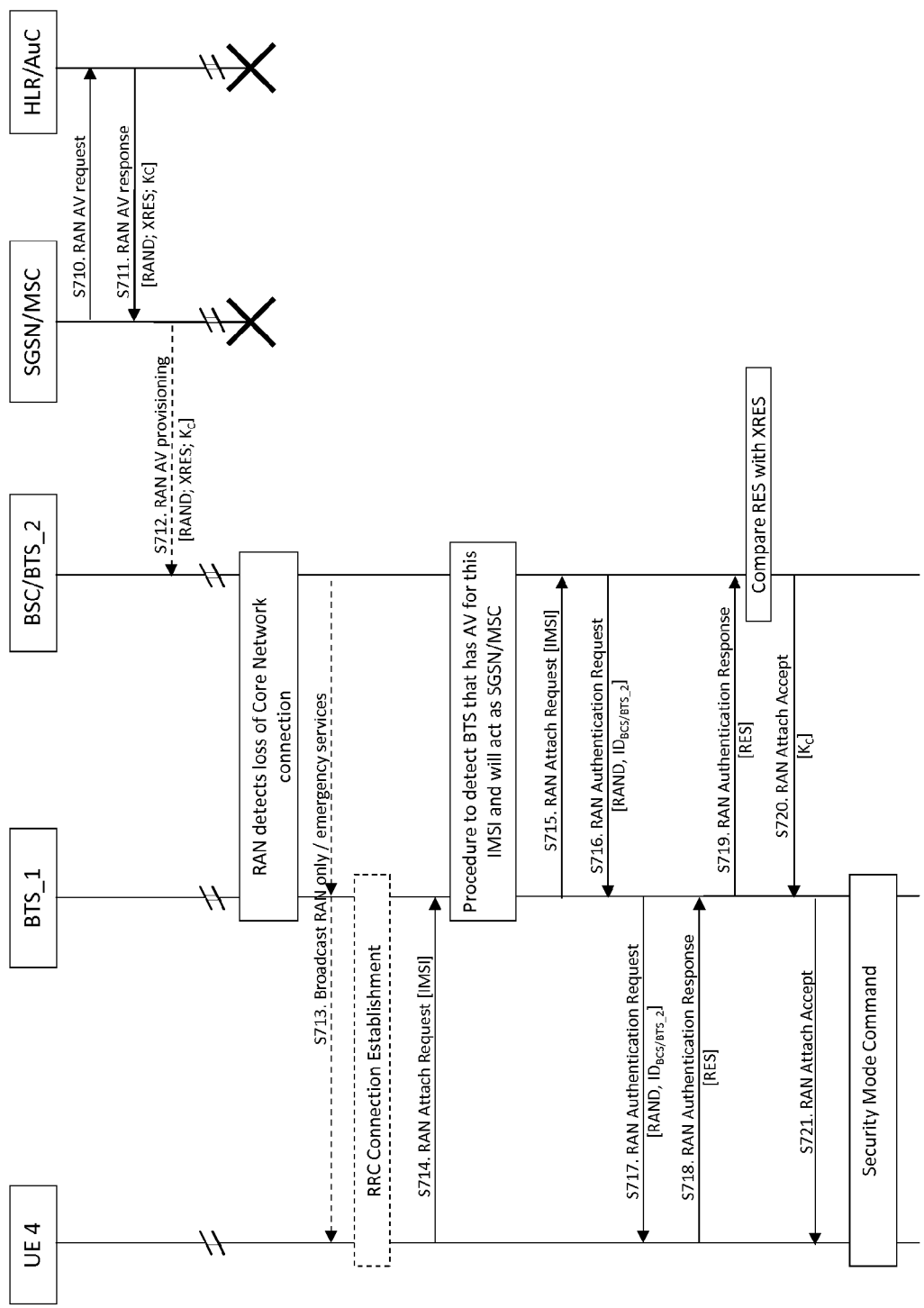
FIG. 7 depicts a more detailed time diagram for performing an authentication and key agreement procedure in an GSM/GPRS telecommunications system as illustrated in FIG. 1 in accordance with an embodiment of the disclosed method.

FIG. 7 depicts a time diagram for performing an authentication and key agreement procedure in a GSM/GPRS telecommunications system as illustrated in FIG. 1. Steps S710-S721 are similar to steps S510-S521 and steps S610-S621, although again different AV's and a different key hierarchy are used. For GSM/GPRS, XRES and $K_C$ are derived using secret key K. It is noted that for a GPRS system, key $K_C$ may not need to be transmitted to BSC/BTS_1, depending on where the SGSN functionality is implemented in the radio access network system.

Figure 8:
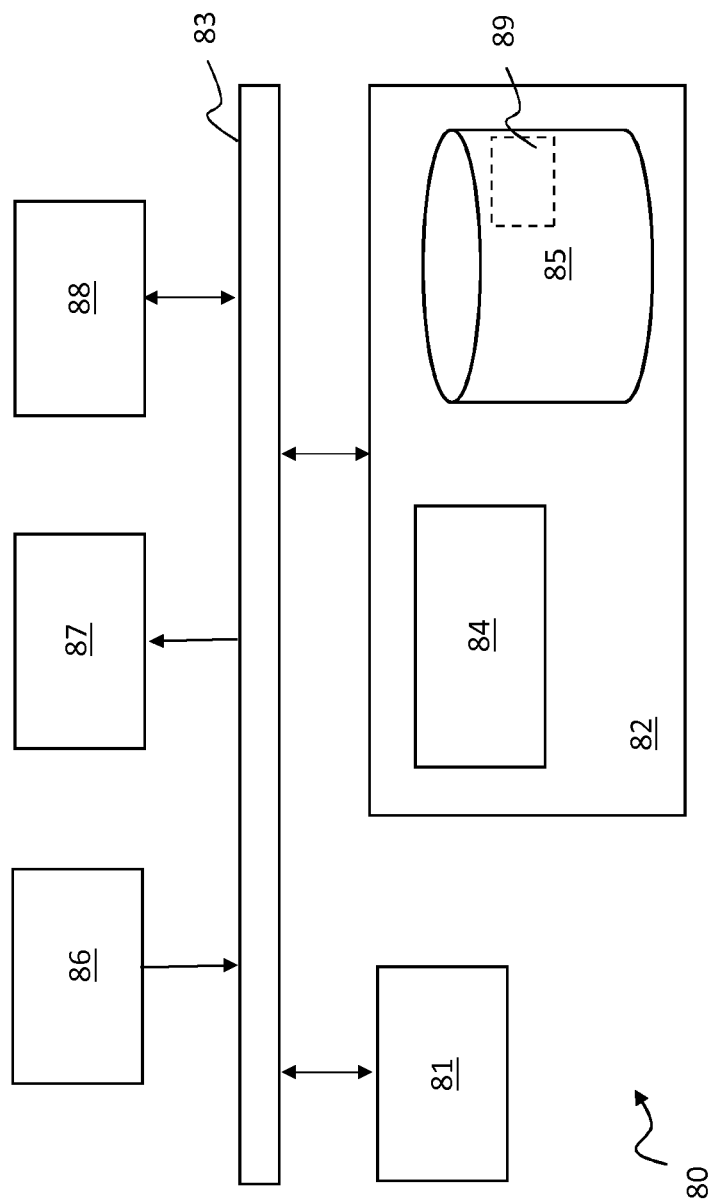
FIG. 8 is a schematic block diagram of an embodiment of a general system or element of a telecommunications network or a user device.

FIG. 8 is a block diagram illustrating an exemplary data processing system 50 that may be used as a device 4 or as a network node in radio access network system 2 (e.g. a base station) or in core network system 3 (e.g. a node with HSS/AuC functionality)

Data processing system 80 may include at least one processor 81 coupled to memory elements 82 through a system bus 83. As such, the data processing system 80 may store program code within memory elements 82. Further, processor 81 may execute the program code accessed from memory elements 82 via system bus 83. In one aspect, data processing system 80 may be implemented as a computer that is suitable for storing and/or executing program code. It should be appreciated, however, that data processing system 80 may be implemented in the form of any system including a processor and memory that is capable of performing the functions described within this disclosure.

Memory elements 82 may include one or more physical memory devices such as, for example, local memory 84 and one or more bulk storage devices 85. Local memory 84 may refer to random access memory or other non-persistent memory device(s) generally used during actual execution of the program code. A bulk storage device may be implemented as a hard drive or other persistent data storage device. The data processing system 80 may also include one or more cache memories (not shown) that provide temporary storage of at least some program code in order to reduce the number of times program code must be retrieved from bulk storage device 85 during execution.

Input/output (I/O) devices depicted as input device 86 and output device 87 optionally can be coupled to the data processing system 80. Examples of input devices may include, but are not limited to, for example, a keyboard, a pointing device such as a mouse, a touchscreen, or the like. Examples of output device may include, but are not limited to, for example, a monitor or display, speakers, or the like. Input device 86 and/or output device 87 may be coupled to data processing system 80 either directly or through intervening I/O controllers. A network adapter 88 may also be coupled to data processing system 80 to enable it to become coupled to other systems, computer systems, remote network devices, and/or remote storage devices through intervening private or public networks. The network adapter 88 may comprise a data receiver for receiving data that is transmitted by said systems, devices and/or networks to said data processing system 80 and a data transmitter for transmitting data to said systems, devices and/or networks. Modems, cable modems, and Ethernet cards are examples of different types of network adapters that may be used with data processing system 80.

As pictured in FIG. 8, memory elements 82 may store an application 89. It should be appreciated that data processing system 80 may further execute an operating system (not shown) that can facilitate execution of the application. Applications, being implemented in the form of executable program code, can be executed by data processing system 80, e.g., by processor 81. Responsive to executing the application 89, the data processing system 80 may be configured to perform one or more operations as described herein in further detail.

In one aspect, for example, data processing system 80 may represent a user device 4, such as a mobile phone, a portable computer, a tablet, smart glasses, a smart watch, an MTC device etc. In that case, application 59 may represent a client application that, when executed, configures data processing system 50 to perform the various functions described herein for the user device 4. The user device 4 may store or have a storage module storing the secret key K.

The user device 4 may receive the RAN-only indication as discussed in general with reference to FIG. 3B that now the radio access network system 2 instead of the core network system 3 performs the authentication and/or key agreement procedure to access a service provided by the radio access network system.

The user device 4 may receive the RAN-only indication as discussed in general with reference to FIG. 3B. The RAN only indication indicates that limited services are available and will be performed by the radio access network system 2. In one embodiment, the user device 4 may be controlled to be limited to only certain services, e.g. by being disabled to request other services that would normally be available using the core network system 3. In order to use the set of services offered by the radio access network system 2, the user device is informed that authentication with the radio access network system 2 is required to access the services offered by the radio access network system 2.

In another embodiment, the user device 4 may process a location indication indicating that the vector is available at a particular node of the radio access network system 2, as described with reference to FIG. 3C.

For example, the user device 4 may receive the location indication and be configured to store the location indication at a particular address in the user device such that it can be applied when necessary. For example, if the user device receives the RAN-only indication from the radio access network system 2, the user device may request to attach to the radio access network system 2, retrieve the location indication from the address where it is stored and include the location indication in the request to inform the radio access network 2 where the at least one vector is available.

The user device 4 may also be configured to process a signalling message indicating that one or more values of the vector are non-operable for performing the authentication procedure and/or the key agreement procedure when the core network system 3 is able to perform the authentication procedure and the key agreement procedure. This may prevent false base station attacks. For example, the user device may be configured, e.g. programmed, to only authenticate the radio access network system using one or more values of the vector if the signalling message indicates that the one or more values are valid in RAN-only mode and a RAN-only mode is indicated by radio access network system 2.

In another aspect, data processing system 80 may represent a network node, such as a base station, in which case application 59 is executed to perform one or more of the operations as described herein. These operations include, but are not limited to, one or more steps as defined in the appended claims, including receiving the vector, storing the vector, performing the authentication and/or key agreement procedure using the received and/or stored vector, detecting unavailability of the core network system, storing a communication identifier, transmitting a RAN-only indication, resolving the location of storage of the received vector in the radio access network system, etc.

In another aspect, data processing system 80 represents a network node or element in the core network system 3, e.g. a node or element having HLR, HSS and/or AuC functionality, in which case application 59 is executed to perform one or more of the operations as described herein. The operations include, but are not limited to, maintaining a register wherein information is registered for one (or a group) of user devices for which the method of the invention is applicable, transmitting the one or more vectors to the radio access network system 2, e.g. periodically and (assisting in) informing the user device of the location where the vector is stored in the radio access network system 2.

It is noted that the method has been described in terms of steps to be performed, but it is not to be construed that the steps described must be performed in the exact order described and/or one after another. One skilled in the art may envision to change the order of the steps and/or to perform steps in parallel to achieve equivalent technical results.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

The embodiments have been chosen and described in order to best explain the principles of the disclosure and the practical application, and to enable others of ordinary skill in the art to understand the invention for various embodiments with various modifications as are suited to the particular use contemplated. Various embodiments of the disclosure may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

The invention claimed is:

1. A security method in a telecommunications network comprising a radio access network (RAN) system and a core network system, wherein the radio access network system is configured to provide a wireless radio interface for at least one user device, wherein a shared secret key is stored in both the user device and the core network system, the method carried out in the radio access network system and comprising:
   receiving from the core network system, at least one vector comprising one or more values derived from the shared secret key;
   storing the at least one vector in the radio access network; and
   after storing the at least one vector, performing at least one of an authentication procedure and a key agreement procedure for the user device over the wireless radio interface using the one or more values of the received vector for establishing a connection between the user device and the radio access network system,
   wherein the core network system pre-stores a RAN only indication associated with the user device to transmit the vector to the radio access network system, the method further comprising only receiving the at least one vector in the radio access network system from the core network system for a user device for which the RAN only indication has been pre-stored.

2. The method according to claim 1, further comprising the detecting an inability to handle the at least one of the authentication procedure and the key agreement procedure from the core network system, wherein receiving the vector is performed prior to detecting the inability and performing the authentication procedure and/or key agreement procedure using the one or more values of the received vector is performed after detecting the inability.

3. The method according to claim 1, further comprising storing at least one communication identifier in the radio access network system, the communication identifier enabling a communication service to be established for the user device.

4. The method according claim 1, further comprising:
   periodically receiving the vector from the core network system.

5. The method according to claim 1, wherein the radio access network system comprises at least a first node and a second node, communicatively connected to the first node, the method further comprising:
   receiving a request for establishing a connection at the first node in the radio access network system; and
   performing the at least one of the authentication procedure and the key agreement procedure at the second node in the radio access network system.

6. The method according to claim 5, further comprising:
   receiving a location indication at the first node in the request for establishing a connection, the location indication indicating that the vector is available at the second node.

7. The method according to claim 1, further comprising:
   receiving the vector in a trusted node in the radio access network system.

8. The method according to claim 1, further comprising refreshing one or more vectors in the radio access network system for performing the at least one of the authentication procedure and the key agreement procedure.

9. The method according claim 1, further comprising:
   transmitting a RAN-only indication to the user device that the radio access network system performs the at least one of the authentication procedure and the key agreement procedure for obtaining one or more services from the radio access network system.

10. The method according to claim 5, further comprising:
    recording in a third node of the radio access network system that the vector is available at the second node and informing the first node by the third node that the vector is available at the second node.

11. The method according to claim 5, further comprising:
    broadcasting a request from the first node in the radio access network system, the request identifying the user device for which the vector is sought.

12. The method according to claim 5, further comprising:
    transmitting a location indication from the second node to the first node and further to the user device, the location indication indicating that the vector is available at the second node.

13. The method according to claim 1, further comprising:
    transmitting a signalling message to the user device indicating that one or more values of the vector are non-operable for performing the authentication procedure and/or the key agreement procedure when the core network system is able to perform the authentication procedure and the key agreement procedure.

14. A non-transitory computer readable medium having instructions stored thereon that, when executed by one or more processors of a radio access network system, cause the radio access network system to carry out operations for security in a telecommunications network, wherein the telecommunications network comprises the radio access network system and a core network system, wherein the radio access network system is configured to provide a wireless radio interface for at least one user device, wherein a shared secret key is stored in both the user device and the core network system, and wherein the operations include:
    receiving from the core network system, at least one vector comprising one or more values derived from the shared secret key;
    storing the at least one vector in the radio access network; and
    after storing the at least one vector, performing at least one of an authentication procedure and a key agreement procedure for the user device over the wireless radio interface using the one or more values of the received vector for establishing a connection between the user device and the radio access network system,
    wherein the core network system pre-stores a RAN only indication associated with the user device to transmit the vector to the radio access network system, the method further comprising only receiving the at least one vector in the radio access network system from the core network system for a user device for which the RAN only indication has been pre-stored.

15. A radio access network system comprising:
    one or more network nodes providing a wireless radio interface for at least one user device and configured to connect to a core network system, wherein, in operation, a shared secret key is stored in both the user device and the core network system;
    a receiver configured for receiving from the core network system at least one vector comprising one or more values derived from the shared secret key;
    a processor configured for performing at least one of an authentication procedure and a key agreement procedure for the user device over the wireless radio interface using the one or more values of the received vector for establishing a connection between the user device and the radio access network system; and one or more processors and memory storing instructions that, when executed by the one or more processors, cause the radio access network system to carry out operations including:

receiving from the core network system, at least one vector comprising one or more values derived from the shared secret key;

storing the at least one vector in the radio access network; and after storing the at least one vector, performing at least one of an authentication procedure and a key agreement procedure for the user device over the wireless radio interface using the one or more values of the received vector for establishing a connection between the user device and the radio access network system, wherein the core network system pre-stores a RAN only indication associated with the user device to transmit the vector to the radio access network system, the method further comprising only receiving the at least one vector in the radio access network system from the core network system for a user device for which the RAN only indication has been pre-stored.

16. A core network system configured for operating with a radio access network (RAN) system, wherein one or more network nodes provides a wireless radio interface for at least one user device and is configured to connect to the core network system, wherein, in operation, a shared secret key is stored in both the user device and the core network system;

wherein the radio access network system is configured for:

receiving from the core network system, at least one vector comprising one or more values derived from the shared secret key, storing the at least one vector in the radio access network, and after storing the at least one vector, performing at least one of an authentication procedure and a key agreement procedure for the user device over the wireless radio interface using the one or more values of the received vector for establishing a connection between the user device and the radio access network system;

and wherein the core network comprises:

a register configured for storing a RAN only subscription indication associated with the user device indicating that the vector should be transmitted to the radio access network system;

a processor, configured for controlling transmission of the vector for the user device only if the register has a pre-stored RAN only subscription indication; and a transmitter, controlled by the processor, for transmitting the vector to the radio access network system.

17. A user device configured for establishing a connection with a radio access network (RAN) system of a telecommunications network over a wireless radio interface, the telecommunications network comprising the radio access network system and a core network system, wherein a shared secret key is stored in both the user device and the core network system, wherein the radio access network system is configured to:

receive from the core network system at least one vector comprising one or more values derived from the shared secret key, store the at least one vector in the radio access network, after storing the at least one vector, perform at least one of an authentication procedure and a key agreement procedure for the user device over the wireless radio interface using the one or more values of the received vector for establishing a connection between the user device and the radio access network system, and transmitting a RAN-only indication, which has been pre-stored, to the user device that the radio access network system performs the at least one of the authentication procedure and the key agreement procedure for obtaining one or more services from the radio access network system, wherein the at least one vector is only received for a user device for which the RAN-only indication has been pre-stored, and wherein the user device comprises:

one or more processors and memory storing instructions that, when executed by the one or more processors, cause the user device to carry out operations including:

processing the RAN-only indication indicating that the at least one of the authentication procedure and key agreement procedure is performed by the radio access network system for accessing services from the radio access network system.

* * * * *